(12) United States Patent
Simoda

(10) Patent No.: US 8,662,597 B2
(45) Date of Patent: Mar. 4, 2014

(54) VEHICLE SEAT

(75) Inventor: Kazufumi Simoda, Toyota (JP)

(73) Assignee: Toyota Boshoku Kabushiki Kaisha, Aichi-Ken (JP)

(*) Notice: Subject to any disclaimer, the term of this patent is extended or adjusted under 35 U.S.C. 154(b) by 81 days.

(21) Appl. No.: 13/396,992

(22) Filed: Feb. 15, 2012

(65) Prior Publication Data

US 2012/0212028 A1   Aug. 23, 2012

(30) Foreign Application Priority Data

Feb. 22, 2011 (JP) ................................. 2011-035642

(51) Int. Cl.
*A47C 7/02* (2006.01)
(52) U.S. Cl.
USPC .................................................... 297/452.62
(58) Field of Classification Search
USPC ........................... 297/452.62, 452.58, 228.13
See application file for complete search history.

(56) References Cited

U.S. PATENT DOCUMENTS

| | | | | |
|---|---|---|---|---|
| 5,280,994 A | * | 1/1994 | Masui et al. | 297/219.1 |
| 5,607,201 A | * | 3/1997 | Irie et al. | 297/452.62 |
| 6,079,779 A | | 6/2000 | Tanaka et al. | |
| 7,823,980 B2 | * | 11/2010 | Niwa et al. | 297/452.61 |

FOREIGN PATENT DOCUMENTS

| | | |
|---|---|---|
| JP | 11-169263 | 6/1999 |
| JP | 2001-8793 | 1/2001 |

* cited by examiner

*Primary Examiner* — Milton Nelson, Jr.
(74) *Attorney, Agent, or Firm* — Greenblum & Bernstein, P.L.C.

(57) ABSTRACT

A vehicle seat includes a seat cushion and a seat back. The seat back includes a skin material including first and second skin sections which cover a rear surface and a side surface therefore, respectively, and a fastener member which couples the first and second skin sections. The first skin section is attached with a carpet member at an end portion thereof. The carpet member has a higher rigidity than the first skin section and being movable between a first position and a second position. The carpet member includes an extended section which faces the end portion of the fastener member at the second position. The end portion of the fastener member is attached to the extended section, and when rotating the carpet member into the first position, the extended section is inserted between the cushion material and the skin material with the end portion of the fastener member.

3 Claims, 4 Drawing Sheets

VEHICLE SEAT

BACKGROUND OF THE INVENTION

1. Field of the Invention

The present invention relates to a vehicle seat having a plurality of skin sections and a fastener member which couples the skin sections to each other.

2. Description of the Related Art

A vehicle seat including a seat cushion and a seat back where a plurality of skin sections are coupled together via a fastener is known (see, for example, JP-A-Hei.11-169263).

The seat back is a member which can stand with respect to the seat cushion, and includes a cushion material which forms a contour of the seat, a skin material which covers the cushion material, and a fastener member. The skin material is a flexible bag-shaped member (such as textile or knit), and has a skin section which covers a side surface of the seat back, a skin section which covers a rear surface of the seat back, and a seam between those skin sections.

The fastener member includes a pair of fastener pieces and a slider member. The pair of fastener pieces are flexible cloth materials (band-shaped) and have concave-convex portions which engage with each other. The slider member is movable along the pair of fastener pieces and can couple those fastener pieces (concave-convex portions) each other.

In the related art, one fastener piece is attached to the skin section which covers the rear surface of the seat back and the other fastener piece is attached to the skin section which covers the side surface of the seat back. In this case, one end of the fastener member is projected from the seat back, and the slider member is attached to the other end of the fastener member in advance.

Then, the slider member is moved from the other end to the one end of the fastener member to couple the fastener pieces, thereby closing the seam of the skin materials to each other. Subsequently, the end portion (projected portion) of the fastener member is bent inside to be accommodated between the cushion material and the skin material (see, for example, FIG. 11 of JP-A-Hei.11-169263).

In the related art, the end portion of the fastener member is bent inside to be accommodated between the cushion material and the skin material. In this case, a part of the skin material is led in together with the fastener member (a triangular gap is generated as the part of the skin material is, so called, wound up), so that the aesthetics of the seat may be deteriorated.

In the related art, the slider member is moved between the cushion material and the skin material (the slider member becomes unstable), so that noises might be generated. Therefore, after the end portion of the fastener member is accommodated, the slider member may be sewed to a back surface of the skin material. However, a process for accommodating the fastener member to the back surface of the skin material would become complicated.

SUMMARY OF THE INVENTION

The present invention has been made in view of the above circumstances, and an object of the present invention is to provide a relatively simple configuration for accommodating a fastener member effectively.

According to an illustrative embodiment of the present invention, there is provided a vehicle seat comprising: a seat cushion; and a seat back. The seat back includes: a cushion material forming a contour of the seat back; a skin material including a plurality of skin sections which cover the cushion material, the plurality of skin sections including a first skin section which covers a rear surface of the seat back and a second skin section which covers a side surface of the seat back; and a fastener member which is configured to couple the first skin section and the second skin section, wherein an end portion of the fastener member which is projected from the seat back in a closed state is accommodated between the cushion material and the skin material. The first skin section is attached with a sheet-shaped carpet member at an end portion of the first skin section, the carpet member having a higher rigidity than the first skin section and being movable between a first position which covers a connection portion of the seat back and the seat cushion and a second position which faces the rear surface of the seat back, the carpet member being rotatable about the end portion of the first skin section. The carpet member includes an extended section which faces the end portion of the fastener member at the second position. The end portion of the fastener member is attached to the extended section, and when rotating the carpet member about the end portion of the first skin section into the first position, the extended section is inserted between the cushion material and the skin material together with the end portion of the fastener member.

In the above vehicle seat, the fastener member may include a pair of fastener pieces and a slider member which is configured to couple the pair of fastener pieces to engage with each other. In the closed state of the fastener member, the slider member may face the extended section. When the extended section is inserted between the cushion material and the skin material, and the slider member may be sandwiched between the cushion material and the extended section or between the skin material and the extended section.

According to the above configuration, the fastener member can be effectively accommodated with a relatively simple configuration.

DETAILED DESCRIPTION

Hereinafter, an illustrative embodiment of the present invention will be described with reference to FIGS. 1 to 7. In each figure, a front side of a vehicle seat is denoted by F, a back side of the vehicle seat is denoted by B, an upper side of the vehicle seat is denoted by UP, and a down side of the vehicle seat is denoted by DW.

Figure 1:
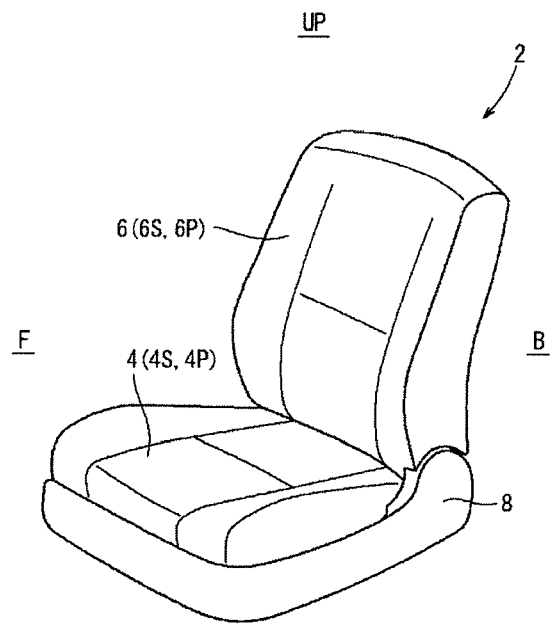
FIG. 1 is a front view of a vehicle seat.

A vehicle seat 2 of FIG. 1 includes a seat cushion 4, a seat back 6, and a shield member 8. The seat cushion 4 and the seat back 6 have cushion materials (4P and 6P) which form the contour of the seat, and skin materials (4S and 6S) which cover the cushion materials, respectively.

The shield member 8 is a reinforcement member having a rectangular shape along the side surface of the seat cushion 4. An upper rear part of the shield member 8 has a substantially circular shape to cover a reclining mechanism (not shown). In the present illustrative embodiment, the shield member 8 may be provided separately at each side of the seat cushion 4.

[Seat Back]

The seat back 6 is a member connected to the seat cushion 4 and configured to stand up or lie down with respect to the seat cushion 4. In the present illustrative embodiment, the skin material 6S of the seat back 6 includes a plurality of skin sections (16f and 16s) and a fastener member 10 (see FIGS. 2 and 3, described later).

After the plurality of skin sections (16f and 16s) are coupled to each other using the fastener member 10, an end portion E of the fastener member 10 in a closed state is accommodated between the cushion material 6P and the skin material 6S. In this kind of configuration, the fastener member 10 is preferred to be accommodated effectively with a relatively simple configuration.

Therefore, the present illustrative embodiment provides a relatively simple configuration of accommodating the fastener member 10 effectively. Hereinafter, each configuration will be described later in detail.

[Skin Material]

The skin material 6S is a bag-shaped member which covers the cushion material 6P, and may be made of cloth (textile, knit, or non-woven fabric) or leather. The skin material 6S of the present illustrative embodiment includes a first skin section 16f, a pair of second skin sections 16s, and a third skin section 16t (see FIGS. 2 to 5).

The first skin section 16f covers a rear surface of the seat back 6, and the pair of second skin sections 16s cover the side surfaces of the seat back 6, respectively. The third skin section 16t covers a top surface of the seat back 6.

In the present illustrative embodiment, while the top surface of the seat back 6 is covered with the third skin section 16t, the third skin section 16t is sewed to the first skin section 16f and the second skin sections 16s. Subsequently, the rear surface of the seat back 6 is covered with the first skin section 16f, and the side surfaces of the seat back 6 are covered with the second skin sections 16s, respectively. In this case, a part of the second skin section 16s is placed on the rear surface of the seat back 6 and is spaced apart from the first skin section 16f. The first skin section 16f and the second skin section 16s are coupled each other using the fastener member 10 to be described later.

[Fastener Member]

Figure 2:
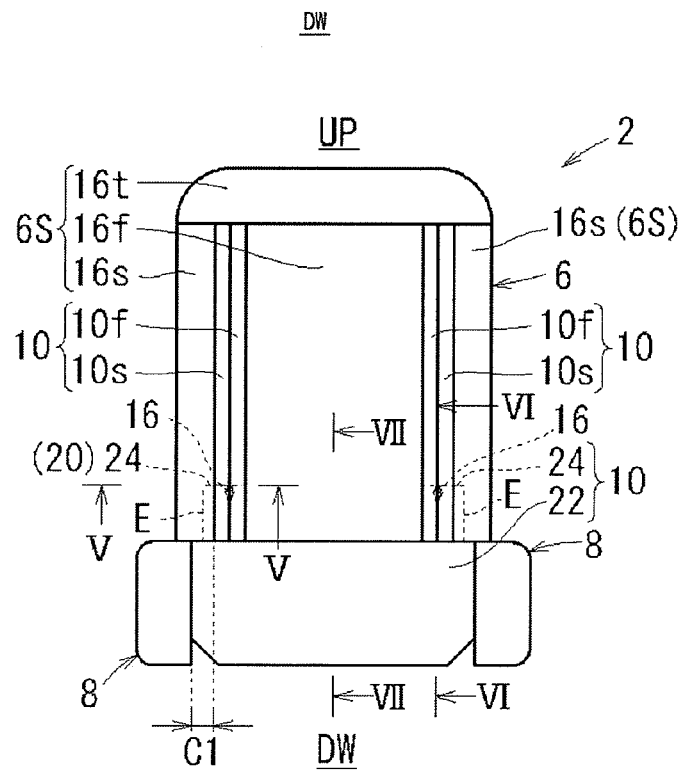
FIG. 2 is a rear view of the vehicle seat.
Figure 5:
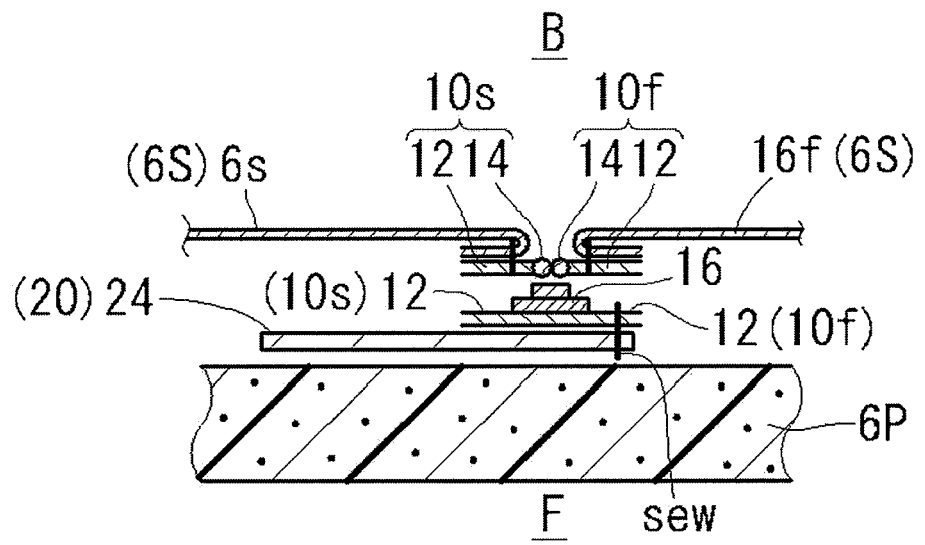
FIG. 5 is a cross-sectional view taken along a line V-V of FIG. 2.
Figure 6:
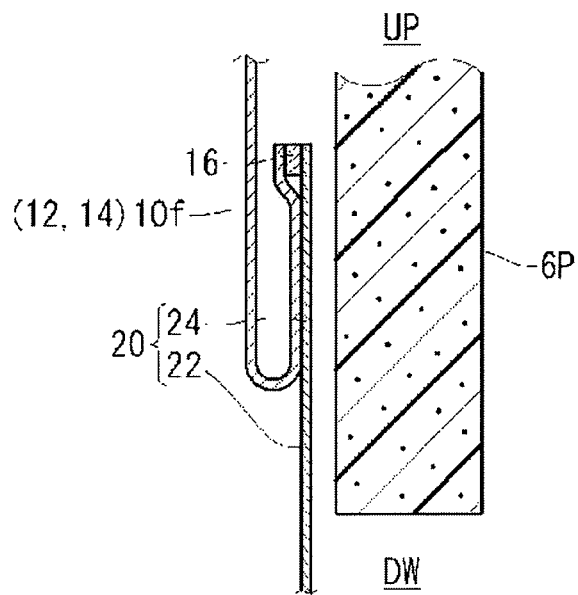
FIG. 6 is a cross-sectional view taken along a line VI-VI of FIG. 2.

The fastener member 10 includes a pair of fastener pieces (one fastener piece 10f and the other fastener piece 10s) and a slider member 16 (see FIGS. 2 and 5).

Each of the fastener pieces (10f and 10s) has a band-shaped base 12 and a concave-convex portion 14 formed along the base 12. The slider member 16 is a member (generally, a metallic material) movable along the pair of fastener pieces (10f and 10s) and is configured to couple the fastener pieces (concave-convex portion 14) each other.

In the present illustrative embodiment, two sets of the fastener member 10 are attached to the rear surface of the seat back 6. In this case, one fastener piece 10f is attached to side end portions of the first skin section 16f to extend in the up-down direction of the seat. The other fastener piece 10s is attached to the second skin sections 16s to extend in the up-down direction of the seat.

As described above, the fastener pieces (10f and 10s) are provided in the up-down direction of the seat in parallel with their concave-convex portions 14 facing each other. A predetermined clearance C1 (generally, approximately 10 mm) is formed between the shield member 8 and the fastener member 10 such that the fastener pieces (10f and 10s) can be closed without being interrupted by the shield member 8.

Figure 3:
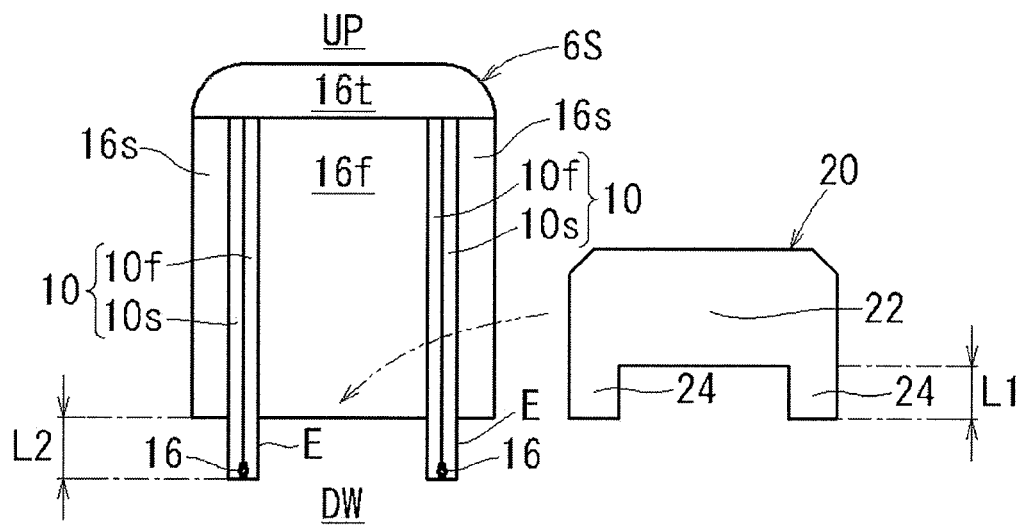
FIG. 3 is a rear view of a carpet member and a skin section.

In the present illustrative embodiment, one end of the fastener member 10 is projected from the bottom of the seat back 6 to configure the end portion E of the fastener member 10 (see FIG. 3).

As described later, the slider member 16 is moved from the other end to the one end, and the pair of fastener pieces (convex-concave portions 14) are coupled to be a closed state. Subsequently, the end portion E of the fastener member 10 in the closed state is accommodated between the cushion material 6P and the skin material 6S from the bottom of the seat back 6 (see FIGS. 2 and 5).

[Carpet Member]

Figure 4:
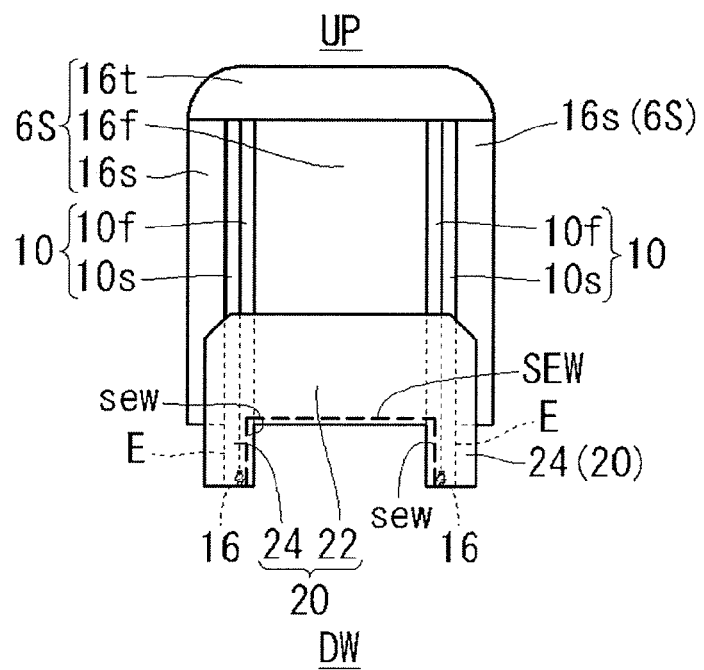
FIG. 4 is a rear view of a seat back.

The carpet member 20 is a sheet-shaped member having higher rigidity than the skin material 6S, and is configured to cover a connection portion between the seat back 6 and the seat cushion 4 (see FIGS. 2 to 4). The material of the carpet member 20 is not limited, but may be felt, leather, or rubber as an example.

The carpet member 20 of the present illustrative embodiment has a body section 22 and a pair of extended sections 24. The body section 22 is a sheet-shaped member having a substantially rectangular shape (viewed from the front) and has a width size suitable to be provided between both shield members 8.

Each of the pair of extended sections 24 is a band-shaped section which is extended from one end of the body section 22 (see FIGS. 3 and 4). Herein, a length size L1 of the extended section 24 may be equal to or larger than a projection size L2 of the end portion E of the fastener member 10.

Figure 7:
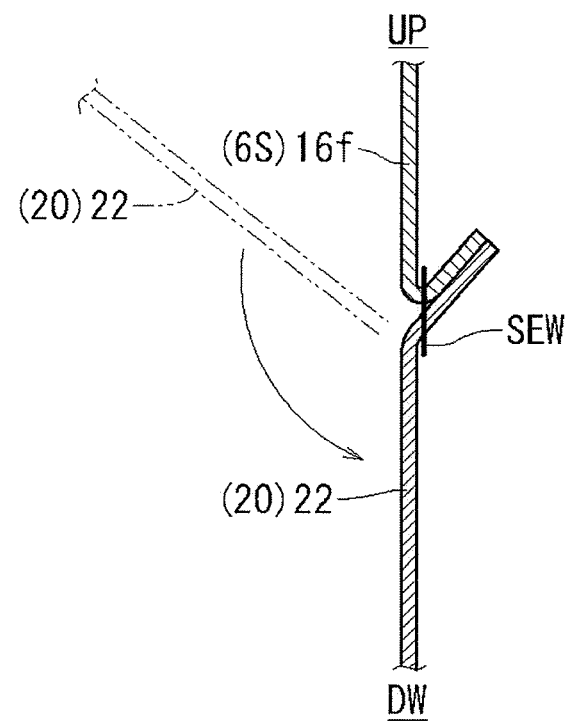
FIG. 7 is a cross-sectional view taken along a line VII-VII of FIG. 2.

In the present illustrative embodiment, the body section 22 of the carpet member 20 is sewed and attached to the bottom of the first skin section 16f while the carpet member 20 faces the first skin section 16f (a sewing line SEW, see FIGS. 4 and 7). The sewing line SEW is formed substantially horizontally in a seat widthwise direction.

By rotating the carpet member 20 about a bottom portion (sewing line SEW) of the first skin section 16f, the body section 22 is moved between a first position and a second position (see FIG. 7). The body section 22 in the first position covers the connection portion between the seat back 6 and the seat cushion 4 to improve the aesthetics of the seat. The body section 22 in the second position faces the rear surface (first skin section 16f) of the seat back 6.

In the present illustrative embodiment, the extended section 24 faces the end portion E of the fastener member 10 in the second position (see FIGS. 4 and 5). The end portion E (only one fastener piece 10f) of the fastener member 10 is sewed and attached to the extended section 24 (a sewing line sew).

[Accommodating Operation of Fastener Member]

Referring to FIG. 4, while the carpet member 20 takes the second position, the slider member 16 is moved from the other end to the one end of the fastener member 10. The slider member 16 couples the fastener pieces (10f and 10s), and thereafter, stops at the end portion of the extended section 24.

Subsequently, referring to FIGS. 5 and 7, by rotating the carpet member 20 about the end (sewing line SEW) of the first skin section 16f as a base end, the carpet member 20 takes the first position to cover the connection portion between the seat back 6 and the seat cushion 4. By this rotation, the extended section 24 is directed to the upper side of the seat back 6 (an opposite side to the body section 22), so that the extended section 24 is inserted between the cushion material 6P and the skin material 6S (see FIGS. 2, 5, and 6).

At this time, the extended section 24 is self-sustained between the cushion material 6P and the skin material 6S due to higher surface rigidity of the extended section of the carpet member 20. As a result, the end portion E of the fastener member 10 is accommodated while a position thereof is appropriately determined. Additionally, the slider member 16 is sandwiched between the skin material 6S (first skin section 16f) and the extended section 24 to be stably sustained (see FIGS. 5 and 6).

As described above, in the present illustrative embodiment, the carpet member 20 which improves the aesthetics of the seat also serves to determine a position of the fastener member 10. By rotating the carpet member 20 (a relatively simple operation), the extended section 24 is inserted between the cushion material 6P and the skin material 6S together with the end portion E of the fastener member 10. As a result, the aesthetics of the seat can be prevented from being deteriorated (generation of a triangular gap) and the fastener member 10 can easily be accommodated. The end portion E of the fastener member 10 can be stably accommodated between the cushion material 6P and the skin material 6S together with the extended section 24 having high rigidity.

In the present illustrative embodiment, the extended section 24 is provided at a part where the end portion E of the fastener member 10 passes (the extended section 24 is formed to have a band shape), and as a result, material consumption of the carpet member 20 can be suppressed to the minimum.

In the present illustrative embodiment, the slider member 16 is stably sandwiched between the skin material 6S and the extended section 24. As described above, the slider member 16 is sustained stably to prevent or reduce the generation of noises which are caused due to the movement of the slider member 16.

Accordingly, in the present illustrative embodiment, the fastener member 10 can be accommodated effectively with the relatively simple configuration.

The vehicle seat of the present illustrative embodiment is not limited to the above-described illustrative embodiment, but may have various other illustrative embodiments.

(1) In the present illustrative embodiment, the band-shaped extended section is illustrated, but the shape of the extended section is not limited thereto. The extended section may have various shapes as long as facing the end portion of the fastener member 10.

(2) In the present illustrative embodiment, the configuration of the fastener member 10 is illustrated, but the configuration of the fastener member 10 is not limited thereto. For example, a fastener member without the slider member may be adopted.

(3) In the present illustrative embodiment, the plurality of fastener members 10 are attached to the seat back 6 as an example, but a single fastener member may be attached to the seat back 6. For example, the single fastener member may be provided at a center of the seat back. In this case, a single extended section is provided at the carpet member.

(4) The fastener member of the present illustrative embodiment may be attached to the carpet member by using various techniques such as sewing, adhesive, and fusion. The carpet member may be attached to the skin section using various techniques such as sewing, adhesive, and fusion.

(5) In the present illustrative embodiment, the slider member 16 is sandwiched between the skin material 6S and the extended section 24 as an example. However, the slider member 16 may be sandwiched between the cushion material 6P and the extended section 24.

What is claimed is:

1. A vehicle seat comprising:
a seat cushion; and
a seat back including:
a cushion material defining a contour of the seat back;
a skin material including a plurality of skin sections which cover the cushion material, the plurality of skin sections including a first skin section which covers a rear surface of the seat back and a second skin section which covers a side surface of the seat back; and
a fastener member which is configured to couple the first skin section and the second skin section, wherein an end portion of the fastener member which is projected from the seat back in a closed state is accommodated between the cushion material and the skin material,
wherein the first skin section is attached with a sheet-shaped carpet member at an end portion of the first skin section, the carpet member having a higher rigidity than the first skin section and being movable between a first position and a second position, by the carpet member being rotatable about the end portion of the first skin section,
wherein in the first position, the carpet member covers a connection portion of the seat back and the seat cushion, and in the second position, the carpet member faces the rear surface of the seat back,
wherein the carpet member includes an extended section which faces the end portion of the fastener member at the second position, and
wherein the end portion of the fastener member is attached to the extended section, and when the carpet member is rotated about the end portion of the first skin section into the first position, the extended section is insertable between the cushion material and the skin material together with the end portion of the fastener member.

2. The vehicle seat according to claim 1,
wherein the fastener member includes a pair of fastener pieces and a slider member which is configured to couple the pair of fastener pieces to engage with each other,
wherein in the closed state of the fastener member, the slider member faces the extended section, and
wherein when the extended section is inserted between the cushion material and the skin material, the slider member is sandwiched between the cushion material and the extended section.

3. The vehicle seat according to claim 1,
wherein the fastener member includes a pair of fastener pieces and a slider member which is configured to couple the pair of fastener pieces to engage with each other,
wherein in the closed state of the fastener member, the slider member faces the extended section, and
wherein when the extended section is inserted between the cushion material and the skin material, the slider member is sandwiched between the skin material and the extended section.

* * * * *